(12) United States Patent
Santi

(10) Patent No.: US 8,544,304 B2
(45) Date of Patent: Oct. 1, 2013

(54) METHOD FOR IMPROVING FATIGUE RESISTANCE OF A THREADED JOINT

(75) Inventor: Nestor J. Santi, Buenos Aires (AR)

(73) Assignee: Tenaris Connections Limited, Kingstown (VC)

( * ) Notice: Subject to any disclaimer, the term of this patent is extended or adjusted under 35 U.S.C. 154(b) by 734 days.

(21) Appl. No.: 12/674,800

(22) PCT Filed: Aug. 21, 2008

(86) PCT No.: PCT/EP2008/060936
§ 371 (c)(1),
(2), (4) Date: Feb. 23, 2010

(87) PCT Pub. No.: WO2009/027309
PCT Pub. Date: Mar. 5, 2009

(65) Prior Publication Data
US 2011/0041581 A1  Feb. 24, 2011

(30) Foreign Application Priority Data
Aug. 24, 2007 (EP) .................... 07114962

(51) Int. Cl.
*C21D 7/06* (2006.01)
*B23Q 1/00* (2006.01)

(52) U.S. Cl.
USPC ............................... 72/53; 29/283.5

(58) Field of Classification Search
USPC ............... 29/281.1, 280, 283.5, 90.7; 72/53
See application file for complete search history.

(56) References Cited

U.S. PATENT DOCUMENTS

| 1,590,357 A | 6/1926 | Feisthamel |
| 1,671,458 A | 5/1928 | Wilson |
| 1,999,706 A | 4/1935 | Spang |
| 2,075,427 A | 3/1937 | Church |
| 2,211,173 A | 8/1940 | Shaffer |
| 2,487,241 A | 11/1949 | Hilton |

(Continued)

FOREIGN PATENT DOCUMENTS

| AT | 388791 B | 8/1989 |
| CA | 2319926 | 7/2008 |

(Continued)

OTHER PUBLICATIONS

U.S. Appl. No. 11/546,974, filed Nov. 5, 2003 and its ongoing prosecution history, including without limitation Office Actions, Amendments, Remarks, and any other potentially relevant documents.

(Continued)

*Primary Examiner* — Dana Ross
*Assistant Examiner* — Lawrence Averick
(74) *Attorney, Agent, or Firm* — Knobbe, Martens, Olson & Bear, LLP

(57) ABSTRACT

A make-up method for a threaded joint with a pin and a box to increase the fatigue life of the joint is provided. The method includes the step of applying a torque for making up the pin in the box until first and second abutment shoulders of the pin and the box abut. The method can also include the step of applying an additional torque to the threaded joint until a magnitude of between 50% and 90% of the yield strength of the joint material in the most stressed part of the joint is reached.

23 Claims, 3 Drawing Sheets

(56) References Cited

U.S. PATENT DOCUMENTS

| | | |
|---|---|---|
| 2,631,871 A | 3/1953 | Stone |
| 2,841,429 A | 10/1955 | McCuistion |
| 2,766,998 A | 10/1956 | Watts et al. |
| 2,992,021 A | 7/1961 | Nay |
| 2,992,613 A | 7/1961 | Bodine |
| 3,054,628 A | 9/1962 | Hardy et al. |
| 3,307,860 A | 3/1967 | Blount et al. |
| 3,489,437 A | 1/1970 | Duret |
| 3,572,777 A | 3/1971 | Blose et al. |
| 3,599,931 A | 8/1971 | Hanson |
| 3,810,793 A | 5/1974 | Heller |
| 3,889,989 A | 6/1975 | Legris et al. |
| 3,893,919 A | 7/1975 | Flegel et al. |
| 4,147,368 A | 4/1979 | Baker et al. |
| 4,299,412 A | 11/1981 | Parmann |
| 4,373,750 A | 2/1983 | Mantelle et al. |
| 4,384,737 A | 5/1983 | Reusser |
| 4,406,561 A | 9/1983 | Ewing |
| 4,426,095 A | 1/1984 | Buttner |
| 4,475,839 A | 10/1984 | Strandberg |
| 4,570,982 A | 2/1986 | Blose et al. |
| 4,591,195 A | 5/1986 | Chelette et al. |
| 4,601,491 A | 7/1986 | Bell, Jr. et al. |
| 4,602,807 A | 7/1986 | Bowers |
| 4,623,173 A | 11/1986 | Handa et al. |
| 4,662,659 A | 5/1987 | Blose et al. |
| 4,688,832 A * | 8/1987 | Ortloff et al. ............ 285/148.19 |
| 4,706,997 A | 11/1987 | Carstensen |
| 4,762,344 A | 8/1988 | Perkins et al. |
| 4,844,517 A | 7/1989 | Beiley et al. |
| 4,856,828 A | 8/1989 | Kessler et al. |
| 4,955,645 A | 9/1990 | Weems |
| 4,958,862 A | 9/1990 | Cappelli et al. |
| 4,988,127 A | 1/1991 | Cartensen |
| 5,007,665 A | 4/1991 | Bovisio et al. |
| 5,067,874 A | 11/1991 | Foote |
| 5,137,310 A | 8/1992 | Noel et al. |
| 5,143,381 A | 9/1992 | Temple |
| 5,180,008 A | 1/1993 | Aldridge et al. |
| 5,348,350 A * | 9/1994 | Blose et al. ...................... 285/94 |
| 5,505,502 A | 4/1996 | Smith et al. |
| 5,515,707 A | 5/1996 | Smith |
| 5,712,706 A | 1/1998 | Castore et al. |
| 5,794,985 A | 8/1998 | Mallis |
| 5,810,401 A | 9/1998 | Mosing et al. |
| 6,044,539 A | 4/2000 | Guzowksi |
| 6,045,165 A * | 4/2000 | Sugino et al. .................. 285/333 |
| 6,056,324 A | 5/2000 | Reimert et al. |
| 6,070,912 A | 6/2000 | Latham |
| 6,173,968 B1 | 1/2001 | Nelson et al. |
| 6,347,814 B1 | 2/2002 | Cerruti |
| 6,349,979 B1 | 2/2002 | Noel et al. |
| 6,412,831 B1 | 7/2002 | Noel et al. |
| 6,447,025 B1 | 9/2002 | Smith |
| 6,478,344 B2 | 11/2002 | Pallini, Jr. et al. |
| 6,481,760 B1 | 11/2002 | Noel et al. |
| 6,494,499 B1 | 12/2002 | Galle, Sr. et al. |
| 6,550,822 B2 | 4/2003 | Mannella et al. |
| 6,557,906 B1 | 5/2003 | Carcagno |
| 6,581,940 B2 | 6/2003 | Dittel |
| 6,752,436 B1 | 6/2004 | Verdillon |
| 6,755,447 B2 | 6/2004 | Galle, Jr. et al. |
| 6,764,108 B2 | 7/2004 | Ernst et al. |
| 6,851,727 B2 | 2/2005 | Carcagno et al. |
| 6,857,668 B2 | 2/2005 | Otten et al. |
| 6,905,150 B2 | 6/2005 | Carcagno et al. |
| 6,921,110 B2 | 7/2005 | Morotti et al. |
| 6,971,681 B2 | 12/2005 | Dell'Erba et al. |
| 6,991,267 B2 | 1/2006 | Ernst et al. |
| 7,014,223 B2 * | 3/2006 | Della Pina et al. ............ 285/333 |
| 7,066,499 B2 | 6/2006 | Della Pina et al. |
| 7,108,063 B2 | 9/2006 | Carstensen |
| 7,255,374 B2 | 8/2007 | Carcagno et al. |
| 7,284,770 B2 | 10/2007 | Dell'erba et al. |
| 7,431,347 B2 * | 10/2008 | Ernst et al. ...................... 285/333 |
| 7,464,449 B2 | 12/2008 | Santi et al. |
| 7,475,476 B2 | 1/2009 | Roussie |
| 7,506,900 B2 | 3/2009 | Carcagno et al. |
| 7,621,034 B2 | 11/2009 | Roussie |
| 7,735,879 B2 | 6/2010 | Toscano et al. |
| 7,753,416 B2 | 7/2010 | Mazzaferro et al. |
| 8,215,680 B2 | 7/2012 | Santi |
| 8,262,140 B2 | 9/2012 | Santi et al. |
| 8,333,409 B2 | 12/2012 | Santi et al. |
| 2003/0168859 A1 | 9/2003 | Watts |
| 2004/0118490 A1 | 6/2004 | Klueh et al. |
| 2004/0118569 A1 | 6/2004 | Brill et al. |
| 2004/0195835 A1 * | 10/2004 | Noel et al. .................... 285/333 |
| 2004/0262919 A1 | 12/2004 | Dutilleul et al. |
| 2005/0093250 A1 * | 5/2005 | Santi et al. .................... 277/602 |
| 2005/0166986 A1 | 8/2005 | Dell'erba et al. |
| 2006/0006600 A1 | 1/2006 | Roussie |
| 2006/0273586 A1 | 12/2006 | Reynolds, Jr. et al. |
| 2007/0039149 A1 | 2/2007 | Roussie |
| 2007/0246219 A1 | 10/2007 | Mannella et al. |
| 2008/0264129 A1 * | 10/2008 | Cheppe et al. ..................... 72/53 |
| 2008/0303274 A1 | 12/2008 | Mazzaferro et al. |
| 2010/0181727 A1 | 7/2010 | Santi et al. |
| 2010/0181761 A1 | 7/2010 | Santi et al. |
| 2010/0187808 A1 | 7/2010 | Santi |
| 2011/0008101 A1 | 1/2011 | Santi et al. |
| 2011/0042946 A1 | 2/2011 | Santi |
| 2011/0097235 A1 | 4/2011 | Turconi et al. |
| 2011/0133449 A1 | 6/2011 | Mazzaferro |
| 2011/0233925 A1 | 9/2011 | Pina |
| 2011/0233926 A1 | 9/2011 | Carcagno |
| 2012/0032435 A1 | 2/2012 | Carcagno |

FOREIGN PATENT DOCUMENTS

| | | |
|---|---|---|
| DE | 3310226 A1 | 10/1984 |
| EP | 0 032 265 | 7/1981 |
| EP | 0 104 720 | 4/1984 |
| EP | 0 159 385 | 10/1985 |
| EP | 0 309 179 | 3/1989 |
| EP | 0 340 385 | 11/1989 |
| EP | 0 989 196 | 3/2000 |
| EP | 1 065 423 | 1/2001 |
| EP | 1 277 848 | 1/2003 |
| EP | 1296088 A1 | 3/2003 |
| EP | 1 362977 | 11/2003 |
| EP | 1 705 415 | 9/2006 |
| EP | 1726861 A1 | 11/2006 |
| EP | 1554518 B1 | 1/2009 |
| FR | 1 149 513 A | 12/1957 |
| FR | 2 704 042 A | 10/1994 |
| FR | 2 848 282 A1 | 6/2004 |
| GB | 1 398 214 | 6/1973 |
| GB | 1 428 433 | 3/1976 |
| GB | 2 276 647 | 10/1994 |
| GB | 2 388 169 A | 11/2003 |
| JP | 58-187684 | 12/1983 |
| JP | 07-139666 | 5/1995 |
| WO | WO 84/02947 | 8/1984 |
| WO | WO 94/29627 | 12/1994 |
| WO | WO 96/22396 | 7/1996 |
| WO | WO 00/06931 | 2/2000 |
| WO | WO 01/75345 | 10/2001 |
| WO | WO 02/29290 | 4/2002 |
| WO | WO 02/35128 | 5/2002 |
| WO | WO 02/068854 | 9/2002 |
| WO | WO 02/086369 | 10/2002 |
| WO | WO 02/093045 | 11/2002 |
| WO | WO 03/087646 | 10/2003 |
| WO | WO 2004/033951 | 4/2004 |
| WO | WO 2004/053376 | 6/2004 |
| WO | WO 2006/087361 | 4/2006 |
| WO | WO 2007/002576 | 1/2007 |
| WO | WO 2007/017082 | 2/2007 |
| WO | WO 2007/017161 | 2/2007 |
| WO | WO 2007/028443 | 3/2007 |
| WO | WO 2007/063079 | 6/2007 |
| WO | WO 2008/090411 | 7/2008 |
| WO | WO 2009/000851 | 12/2008 |
| WO | WO 2009/000766 | 1/2009 |

| WO | WO 2009/010507 | 1/2009 |
| WO | WO 2009/027308 | 3/2009 |
| WO | WO 2009/027309 | 3/2009 |
| WO | WO 2009/106623 | 9/2009 |
| WO | WO 2010/122431 | 10/2010 |

OTHER PUBLICATIONS

U.S. Appl. No. 12/665,921, filed Dec. 21, 2009 and its ongoing prosecution history, including without limitation Office Actions, Amendments, Remarks, and any other potentially relevant documents.

U.S. Appl. No. 12/669,177, filed Jan. 14, 2010 and its ongoing prosecution history, including without limitation Office Actions, Amendments, Remarks, and any other potentially relevant documents.

U.S. Appl. No. 12/665,902, filed Dec. 21, 2009 and its ongoing prosecution history, including without limitation Office Actions, Amendments, Remarks, and any other potentially relevant documents.

U.S. Appl. No. 12/920,085, filed Aug. 27, 2010 and its ongoing prosecution history, including without limitation Office Actions, Amendments, Remarks, and any other potentially relevant documents.

U.S. Appl. No. 12/673,833, filed Feb. 17, 2010 and its ongoing prosecution history, including without limitation Office Actions, Amendments, Remarks, and any other potentially relevant documents.

U.S. Appl. No. 12/954,588, filed Nov. 24, 2010 and its ongoing prosecution history, including without limitation Office Actions, Amendments, Remarks, and any other potentially relevant documents.

U.S. Appl. No. 13/072,533, filed Mar. 25, 2011 and its ongoing prosecution history, including without limitation Office Actions, Amendments, Remarks, and any other potentially relevant documents, Della Pina et al.

U.S. Appl. No. 13/073,917, filed Mar. 28, 2011 and its ongoing prosecution history, including without limitation Office Actions, Amendments, Remarks, and any other potentially relevant documents, Carcagno, et al.

American Petroleum Institute, Specification 5B, Apr. 2008, 15th Edition (Excerpts Only).

Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.

International Preliminary Report on Patentability dated Feb. 24, 2010 from PCT Application No. PCT/EP2008/060936.

International Written Opinion dated Jan. 5, 2009 from PCT Application No. PCT/EP2008/060936.

International Search Report from PCT/EP2008/060936, Jan. 5, 2009, 3 pages.

The ongoing prosecution history of U.S. Appl. No. 13/264,731, filed Oct. 14, 2011, including without limitation Office Actions, Amendments, Remarks, and any other potentially relevant documents.

* cited by examiner

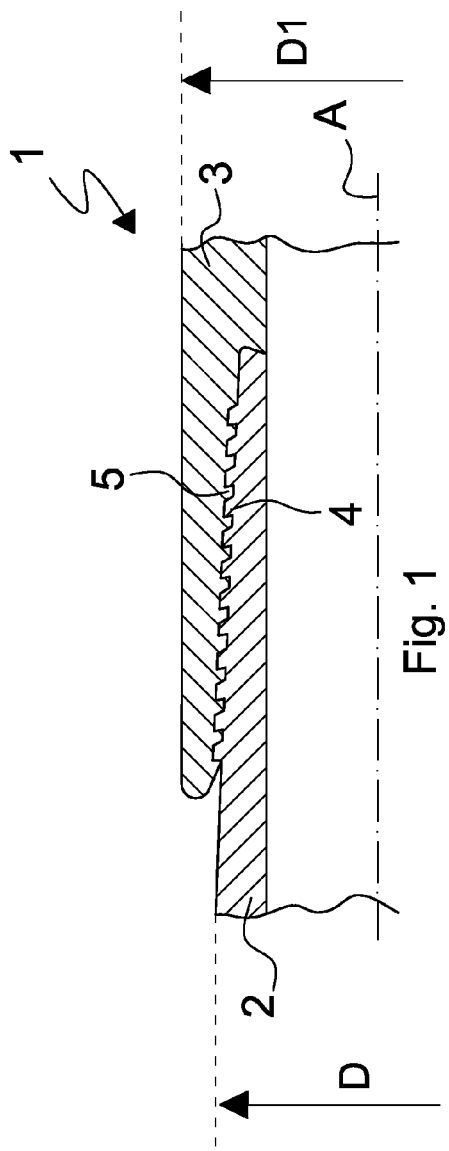
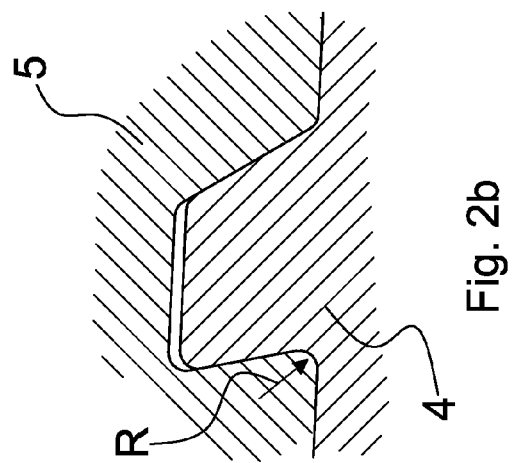
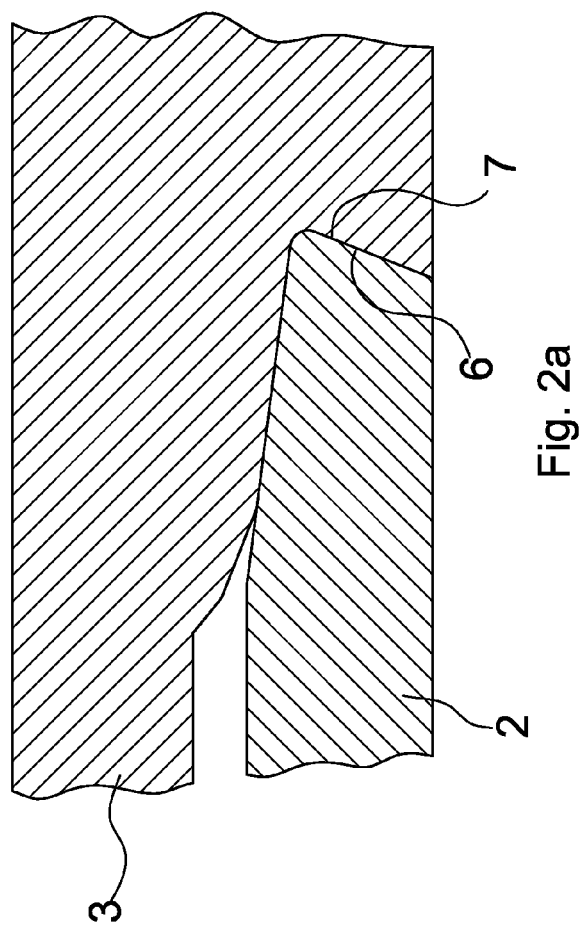
Fig. 1
Fig. 2a
Fig. 2b

METHOD FOR IMPROVING FATIGUE RESISTANCE OF A THREADED JOINT

CROSS-REFERENCE TO RELATED APPLICATIONS

This application is a U.S. National Phase of PCT International Application No. PCT/EP2008/060936, filed Aug. 21, 2008 and published as WO 2009/027309 on Mar. 5, 2009, which claims priority to European Application No. 07114962.9, filed Aug. 24, 2007. The disclosure of both prior applications is incorporated by reference in their entirety and should be considered a part of this specification.

FIELD OF THE INVENTION

The present invention relates to a method for improving fatigue resistance of threaded joints, in particular for connecting tubes of predefined length to create strings used in the hydrocarbon industry especially for use in the field of OCTG (Oil Country Tubular Goods) and line pipes in offshore applications.

BACKGROUND OF THE INVENTION

Searching for oil or more generally hydrocarbons is becoming more demanding in terms of hardware and devices in recent years because oil and gas fields or reservoirs are located deeper or in positions difficult to reach. Prospecting and exploiting hydrocarbon fields laying under deep sea has become customary and necessitates hardware which is more resistant to environmental challenges like fatigue and corrosion, which were previously less important.

For extracting oil or gas from fields lying below deep sea off-shore platforms are generally used which are anchored to the sea bottom and tube strings are used which are conventionally called risers. They serve to convey oil or gas to the surface.

These tube strings are immersed in the sea and are subject to movements caused by sea streams and surface wave movements. Because of these continuous and periodic movements of the sea the risers do not remain immobile, but are subject to lateral movements of small magnitude which can cause deformations in certain parts of the joint and must withstand loads which induce fatigue stresses in the tubes, with particular respect in the zone of the threaded joint. These stresses tend to cause ruptures in the tubes in the vicinity of the thread and there is a need to improve the fatigue resistance of the threaded joints.

At present, fatigue performance and design for threaded connections for the oil and gas industry are being adapted and extrapolated from other engineering fields. There are no specific standards or design/dimensioning specifications yet. Basic concepts can be found in the British Standard/Code of practice BS7608 for Fatigue design and assessment of steel structures, and DNV Class B S-N curve. Solutions have already been proposed to increase fatigue life of the threaded joints.

U.S. Pat. No. 6,045,165 discloses a method for manufacturing and for making up a threaded joint to improve its corrosion resistance. The joint has either an internal shoulder or an external shoulder or both, each comprising a seal portion and a torque shoulder. It is designed in such a manner that the pitch diameter of the seal forming face on the pin is larger than the same on the box and the inclination of the torque shoulder forming face on the pin is smaller than the same on the box. The difference in the inclination between both sides is in the range of 0.5° to 4.0°. These features provide gas tightness and crevice corrosion resistance.

However the problem of fatigue resistance has not been dealt with in that document.

SUMMARY OF THE INVENTION

It is therefore an object of the present invention to provide a threaded joint which would overcome the aforementioned drawbacks.

The main object of the present invention is thus to provide a method for increasing the fatigue life of a threaded joint.

The above mentioned objects are achieved in accordance with the present invention by means of a method for make up of a threaded joint wherein there is provided a male threaded tube, defined as pin, and a female threaded tube, defined as box, the pin being provided with a first abutment shoulder, the box being provided with a second abutment shoulder, first and second abutment shoulders having complementary shape, the pin being adapted to be made up in the box, the method comprising the steps of a) inserting the threaded portion of pin into the threaded portion of box b) applying a torque for making up the pin in the box until first and second abutment shoulders abut, c) applying an extra torque until a magnitude between 50% and 90% of the steel's yield strength in the most stressed part of the joint is reached.

According to another aspect of the invention the above mentioned objects are achieved in accordance with a threaded joint comprising a male threaded tube, defined as pin, and a female threaded tube, defined as box, the pin being provided with a first abutment shoulder, the box being provided with a second abutment shoulder, the first and second abutment shoulders having complementary shape, the pin being adapted to be made up in the box, wherein the interference between thread roots of either one of pin or box and thread crests of the other one of pin or box measured according to the nominal dimensions of the pin and box comprise between 1% and 5% of the average thickness of the pipe wall and there is provided a root to load flank radius having a value of around ¼ of the thread height.

According to the claimed invention the objective of improving fatigue resistance of the threaded joint is achieved by a combined action of several features which appear at the end of the make up operation on a joint which has been appropriately designed:

a) provision of high radial loads, the so called hoop loads, in function of root-to-crest interference to improve fatigue resistance;

b) provision of high shoulder loads to improve fatigue resistance;

c) provision of enlarged root to flank radius R which lowers stress concentration in thread roots;

d) in addition an appropriate surface preparation of the pin and box surface comprising mainly a shot peening treatment increases further fatigue resistance of the joint.

BRIEF DESCRIPTION OF THE DRAWINGS

The foregoing and other objects will become readily apparent by referring to the following detailed description and the appended drawings in which:

FIG. 1 shows a sectional view on a longitudinal axial plane of the joint on which the method in accordance with the present invention is applied, FIGS. 2a and 2b show enlarged views of the joint of FIG. 1.

DETAILED DESCRIPTION OF THE INVENTION

The method for make up of joints of the invention follows the principle of "improving fatigue resistance by increasing structural integrity of a connection" and was developed with the Taguchi method, based on the theory of octagonal matrices.

Dr. Taguchi developed a method based on "Orthogonal Array" experiments that gives much-reduced variance for the experiment with optimum settings of control parameters. This method takes advantage of the previous knowledge on the product/process. "Orthogonal Arrays" provide a set of well balanced (minimum) experiments and Dr. Taguchi's Signal-to-Noise ratios (S/N) serve as objective functions for optimization and prediction of optimum results. The signal-to-noise ratio needs to be maximized while minimizing the effects of the noise; the level of noise is shown as an error that should be kept low, otherwise the selection of parameters was incomplete and part of noise is actually a signal not properly identified at the beginning of the test.

The parameters to evaluate using the methodology were defined as shown below with two possible states:

Thread profile radii (0.2, 0.3 mm)
Thread interference (0.9%, 4% of average thickness of the connection)
Surface treatment (peened, bare)
Torque on shoulder (less than 12000 ft-lbs, greater than 18000 ft-lbs) aimed values due to the inertia of the make-up tongs.

The above-mentioned parameters were combined as requested by Taguchi's methodology for Design of experiments using a L8 orthogonal matrix—eight experimental trials. The experiments were performed at two stress levels on a pipe with an external diameter of 244 mm and a thickness of 13.84 mm. Table I summarizes the parameters.

TABLE I

L8 Taguchi matrix and test results

| Test Number | Torque on shoulder (Kft-lbs) | Thread Interference (% diam.) | Radius (mm) | Surface Treatment |
|---|---|---|---|---|
| 1 | <12 | 0.9% | 0.3 | P |
| 2 | <12 | 0.9% | 0.2 | B |
| 3 | <12 | 4% | 0.2 | B |
| 4 | <12 | 4% | 0.3 | P |
| 5 | >18 | 0.9% | 0.3 | B |
| 6 | >18 | 0.9% | 0.2 | P |
| 7 | >18 | 4% | 0.2 | P |
| 8 | >18 | 4% | 0.3 | B |

Figure 4:
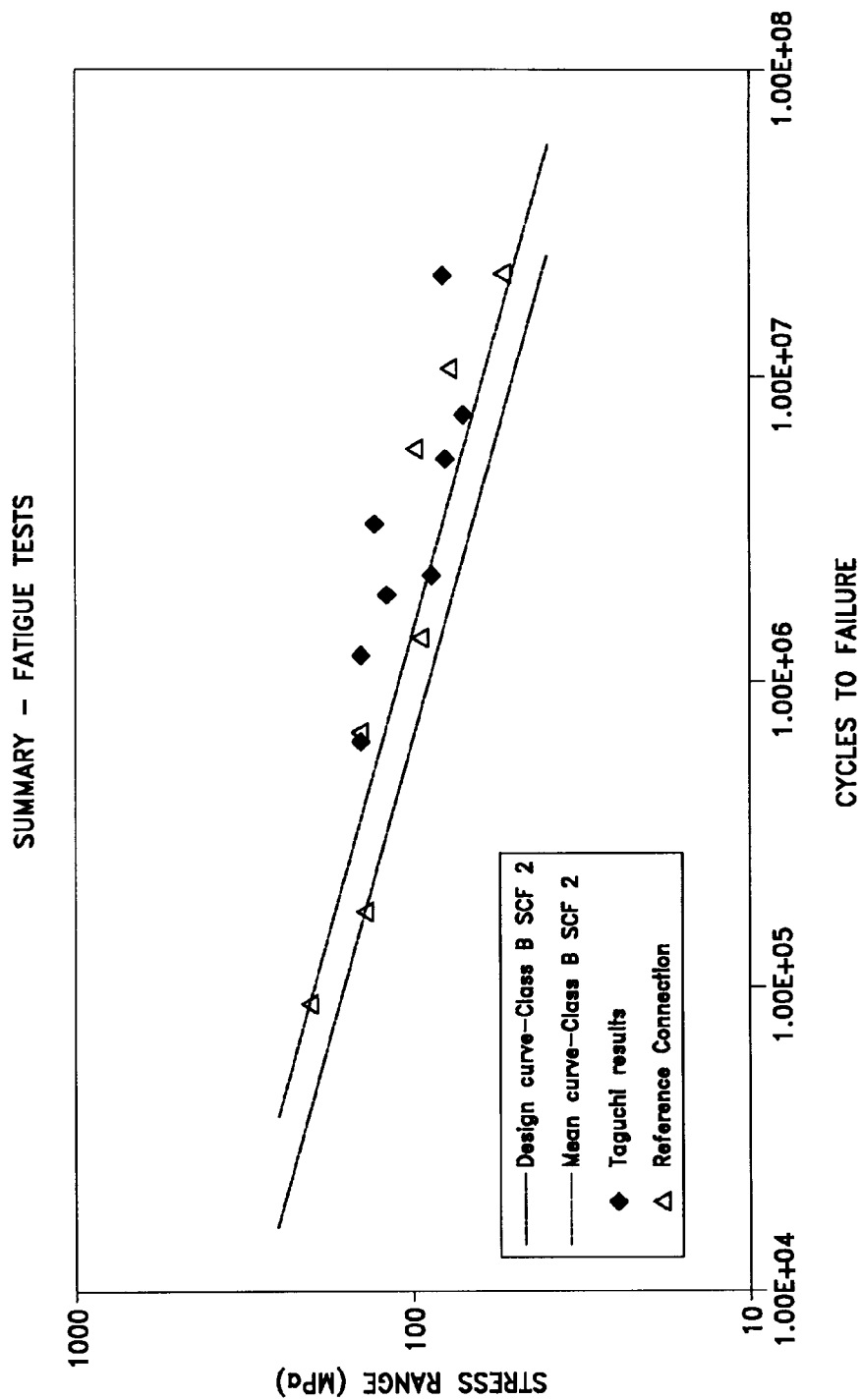
FIG. 4 shows a graph summarizing fatigue tests of various connections.

In FIG. 4 below can be seen the difference of a standard connection and the results of the connections manufactured in accordance to the table above, being the most effective combination the use of higher interference, a higher energy on shoulder, a larger radius and the peened surface. The main effects are seen in the area above the fatigue limit of the material, ~90 MPa.

The output of this method yields several threaded joint configurations and therefore several tests were performed to validate these results.

With particular reference to the figures, there is shown a threaded joint indicated globally with reference numeral 1, connecting two tubes, a male tube, or pin 2, with nominal external diameter D, and a female tube or box 3 of nominal external diameter D1.

The pin 2 has a threaded portion 4 with male threads of appropriate profile, e.g. trapezoidal, and the box 3 has an internal threaded portion 5 with female threads.

The common axis of the pipe and the pin 2 and box 3 is indicated with A. The pin 2 ends with a nose presenting an abutment shoulder 6. The corresponding annular surface of the box 3 where the pin 2 abuts at the end of the make up operation comprises an abutment shoulder 7 having substantially the same shape. The shoulders 6 and 7 are used to transmit compressive axial loads through the joint or to improve its compression resistance under operational loads.

The threads of pin 2 and box 3 are designed in such a manner that when make up is completed the roots of one member, either pin 2 or box 3, and the corresponding crests of the other member have a high radial interference.

The value of this interference measured according to the nominal dimensions of the pin 2 and box 3, that is before making up the two members, is not less than 1% of the average thickness of the joint 1 or connection, i.e. the addition of the average thicknesses of pin 2 and box 1 in the case of the lightest weight covered by the design pipe range; and not higher than 5% of the average thickness of the joint 1, i.e. the addition of the average thicknesses of pin 2 and box 3 in the case of the heaviest weight covered by the design pipe range.

These values of interference assure that the level of stresses in the connection are controlled so as to avoid high stress concentration factors.

In the following table examples of appropriate values of interference are shown in the case of two pipes having different diameter and weight:

| pipe diameter in inches | Weight in lb/ft | interference in % | interference in μm |
|---|---|---|---|
| 9⅝ | 36 | 3% | 370 |
| 13⅜ | 98 | 2% | 360 |

Advantageously, according to the method of the invention, during make up an additional axial energization is provided to the joint 1 by inputting high loads in the shoulders 6 and 7 between pin 2 and box 3. This is made by giving the joint 1 an extra make up torque and therefore by extra loading the shoulder. This has the surprising effect that an improved fatigue resistance is achieved on the joint 1.

This added load produces an additional compressive effect, tending to tension the box 3 and to compress the pin 2, thus improving fatigue stress resistance. This is achieved by balancing the stress distribution over the joint 1 extension, especially over the pin 2.

Figure 3:
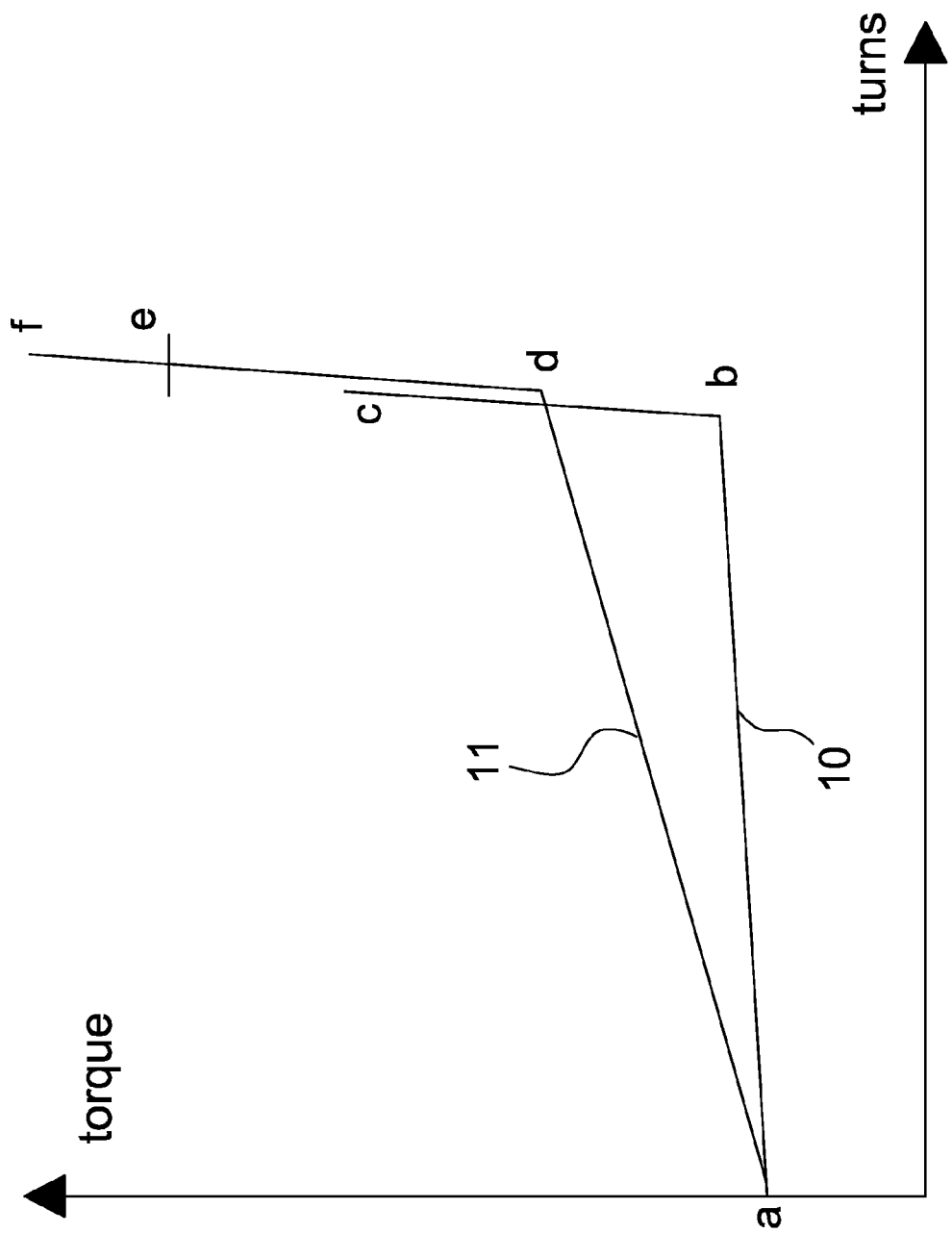
FIG. 3 shows a graph with curves representing the trend of the make up torque necessary to carry out the method according to the invention.

With reference to the graph of FIG. 3, there is shown a Cartesian graph where the abscissa axis represents the number of make up turns and the ordinate axis represents torque magnitude. The graph shows two curves 10 and 11.

The curve 10 represents the torque trend for a state of the art joint during make up according to customary practice. Point "a" of the curve 10 shows the starting point for the make up operation. The segment "a-b" represents the gradual increase of torque due to the customary radial interference which is usual in many state of the art joints. The segment "b-c" represents the increase in torque magnitude due to energising of the abutment shoulders between pin and box.

The curve 11 represents the torque trend applied on a joint following the method of the invention. The segment "a-d" shows the gradual increase of the torque with a steeper angle caused by the greater radial interference between crests and roots of the threads of pin 2 and box 3. The curve segment "d-e" shows the sharp increase of torque caused by the energization of the abutment shoulders 6 and 7 up to a magnitude corresponding to a make up made according to customary practice of known make up methods. The segment "e-f" shows the extra torque, conventionally hereafter also called "Δ torque", applied according to the method of the invention.

The extra torque is applied at the end of the make up of the pin 2 onto the box 3. For example: when a customary make up operation achieves a final torque which produces loads of about 50% of the yield strength, the "Δ torque" applied under the method of the invention increases loads up to an 80% of the yield strength. These values can vary within the whole possible range between 1% and 99%.

There are two points worth noticing in analyzing the make-up method of the invention:

1) Torque shoulder point "d", where the slope of the curve increases suddenly, shows that make up has reached the shouldering position where the shoulder 6 of the pin 2 abuts the shoulder 7 of the box 3. This point "d" marks the end of the first part of the curve 11, where thread interference has been the unique resistance to the applied torque;

2) From point "d" to final torque point "f", where make up ends, the curve becomes nearly a vertical line, since torque values increase suddenly in a fraction of a turn compared to the preceding part of the curve. The reason is that an axial interference must be overcome, consuming the corresponding torque energy which will be stored as elastic energy in the joint.

For each type of commercial joint specific optimized values have been defined, which have been designed, tested and validated according to the following procedure.

In a first step, joint parameters are taken into account, like diameter, thickness, steel grade, thread type. Optimal make up parameters are pre-estimated, modelized and simulated.

In a second step, values are full scale tested and the initial process is retro-fed, in an iterative loop.

As a third and last step, the made up joint undergoes additional validation tests, simulating actual operating conditions in order to validate and qualify the joint and the make up process.

As a consequence of the complexity of the process, make up parameters are not defined in terms of absolute parameters, like diameter or wall thickness of the connection, for example. The Δ torque, corresponding to segment "e-f" of curve 11, is defined as an additional torque or an extension of the torque vs. turns curve. As a general rule neither normal torque nor Δ torque exceeds the yielding strength of the material in the shoulder region. Advantageously, "Δ torque" is defined with a magnitude between 10% and 50% of the normal torque of a state of the art joint, corresponding to the fact that the final torque value, i.e. the normal torque summed to "Δ torque", reaches a value comprised between 50% and 90% of the steel's yield strength. The normal or maximum nominal make up torque is defined by the manufacturers for each specific joint.

Another feature contributing to improving the final fatigue life in addition to implementing the method of the invention is the provision on the joint of enlarged root to load flank radius R.

For the threads of pin 2 and box 3, in order to bear appropriately the higher stresses originated by the radial interference, the radius R between load flank and root is enlarged as shown in particular in FIG. 2b.

It was shown that the use of thread root-to-crest radial interference produces lower stress concentrations, which is also favored by the provision of an enlarged radius.

The mentioned high radial tension can be produced between pin's crests and box's roots, leaving a free space between pin's roots and box's crests, not shown in the figure, or vice versa like shown in FIG. 2b. Also both options can be present in the same joint.

The radius R can be enlarged to a maximum value, limited by the need to preserve joint tension efficiency, specially in the run out threads. If the radius R is too large, tendency for disengagement rises.

The value of the radius R has been set around ¼ of the thread height and due to the possible sizes application this value can be between 0.2 and 0.4 mm with an optimal value of 0.3 mm. This value has proven to optimize the threaded joint 1 performance, according to the results of the tests performed.

Still another improvement that contributes to an increase in fatigue life of the joint 1 is to provide a surface preparation of the pin 2 and box 3 surfaces which includes a shot peening treatment. Advantageously this treatment is made both on the threaded portion and on the non threaded parts, close to the threads, like the metal-to-metal sealing surfaces, when present, and abutment surfaces.

Firstly, this surface treatment provides compression micro pre-loads, which improve fatigue resistance, as proven by well known fatigue investigations.

Secondly, the surface treatment furthermore increases surface hardness. It is proven, and detailed in cold welding theories, that galling between two different surfaces is reduced if their surface hardness and finishing are different. Such a treatment, when applied on either pin 2 or box 3, or applied with different magnitudes to produce different surface properties, or in selected areas of pin 2 and/or box 3, preferably the threaded region 4, 5, can also reduce galling trend. For example, phosphatizing one of the surfaces to make it different from the surface of the other joint member, with which it comes into contact, reduces galling. However, phosphatizing alone is not effective when high loads are involved and combining it also with a shot peening treatment ensures such properties and increases resistance of the joint 1 to high loads.

In a preferred embodiment, such a surface hardening treatment is applied to the pin 2, which is in general more loaded than the box 3, and more specifically to the beginning and end of the threaded zone 4, which are subject to higher stress concentration. This would provide a more homogeneous stress distribution along the whole thread.

The right process parameters for the shot peening were set after several tests which lead to an optimization of the results. One of the main process parameters is intensity of the shot peening, which can be measured by the Almen test, standardized by SAEJ442a standard. According to the results of the tests performed, an Almen intensity between 006A and 015A is suitable for the invention.

Another important parameter is the diameter of the shots (spherical steel or glass particles), which must be defined according to the geometry of the pieces to be treated. For the present invention, a shot diameter between 0.15 mm and 0.35 mm is suitable.

Another advantage of this surface hardening treatment is that it reduces also galling trend when making up the joint.

The invention is used preferably in the field of OCTG and line pipe connections for the oil & gas industry, specially in offshore applications.

What is claimed is:

1. A method of making up a threaded joint, comprising the steps of:
   inserting a threaded pin into a threaded box, wherein the pin and box comprise complementary abutment shoulders, wherein the pin further comprises a pin root to load flank radius R between 0.2 and 0.4 mm,
   applying a make-up torque to one of the pin and box until the complementary abutment shoulders abut, and
   applying an additional torque to one of the pin and box to impart a stress to the joint of 50% to 90% of the yield strength of the material of the joint.

2. The method of claim 1, wherein the thread roots of the pin or box and thread crests of the other of the pin or box define an interference of between 1% and 5% of the average radial thickness of the joint when the pin is inserted in the box.

3. The method of claim 2, further comprising applying a surface treatment to one or both of the pin and box.

4. The method of claim 3, wherein the surface treatment comprises shot peening.

5. The method of claim 4, wherein the shot peening is applied to one or both of a beginning and end of a threaded zone of the pin.

6. The method of claim 4, wherein the shot peening comprises a shot diameter of 0.15 mm to 0.35 mm.

7. The method of claim 1, wherein the flank radius R is about ¼ of the pin thread height.

8. The method of claim 7, wherein the radius R is 0.3 mm.

9. The method of claim 1, wherein said material comprises metal.

10. The method of claim 9, wherein the material is steel.

11. A method of increasing the fatigue life of a threaded joint, comprising the steps of:
    inserting a threaded pin comprising a first abutment shoulder into a threaded box comprising a second abutment shoulder complementary to the first abutment shoulder, wherein the thread roots of the pin or box and thread crests of the other of the pin or box define an interference of between 1% and 5% of the average radial thickness of the joint when the pin is inserted in the box, the pin further comprising a pin root to load flank radius R between 0.2 and 0.4 mm,
    exerting a make-up torque on one of the pin and box until the first and second shoulders abut, and
    exerting a $\Delta$ torque on one of the pin and box, wherein the $\Delta$ torque comprises an amount of torque equal to about 10% to 50% of the make-up torque.

12. The method of claim 11, wherein the $\Delta$ torque comprises the amount of additional torque required to torque the joint to about 50% to 90% of the yield strength of the material of the joint.

13. The method of claim 12, wherein the $\Delta$ torque comprises the amount of additional torque required to torque the joint to about 80% of the yield strength of the material of the joint.

14. The method of claim 11, wherein one or both of the pin and box are made of metal.

15. The method of claim 14, wherein one or both of the pin and box are made of steel.

16. A method of making up a threaded joint, comprising the steps of:
    inserting a threaded pin into a threaded box, wherein:
       the pin and box comprise complementary abutment shoulders,
       the pin further comprises a pin root to load flank radius R of about ¼ of the pin thread height, and a surface treatment comprising shot peening applied to one or both of the beginning and end of the threaded zone of the pin, and
       the thread roots of the pin or box and thread crests of the other of the pin or box defining an interference of between 1% and 5% of the average radial thickness of the joint when the pin is inserted in the box,
    applying a make-up torque until the complementary abutment shoulders abut, and
    applying a $\Delta$ torque to facilitate increased fatigue life of the joint.

17. The method of claim 16, wherein the $\Delta$ torque comprises an amount of torque that is about 10% to 50% of the make up torque.

18. The method of claim 16, wherein the sum of the make up torque and the $\Delta$ torque comprises between 1% and 99% of the yield strength of the material of the joint.

19. The method of claim 18, wherein the sum of the make up torque and the $\Delta$ torque comprises between 50% and 90% of the yield strength of the material of the joint.

20. The method of claim 18, wherein the material of the joint comprises steel.

21. The method of claim 16, wherein the radius R is between 0.2 and 0.4 mm.

22. The method of claim 11, further comprising applying a surface treatment to one or both of the pin and box, the surface treatment comprising shot peening.

23. The method of claim 11, wherein the flank radius R is about ¼ of the pin thread height.

* * * * *

UNITED STATES PATENT AND TRADEMARK OFFICE
CERTIFICATE OF CORRECTION

| | | |
|---|---|---|
| PATENT NO. | : 8,544,304 B2 | Page 1 of 1 |
| APPLICATION NO. | : 12/674800 | |
| DATED | : October 1, 2013 | |
| INVENTOR(S) | : Santi et al. | |

It is certified that error appears in the above-identified patent and that said Letters Patent is hereby corrected as shown below:

In the Specification

Column 3 line 61, after "FIG. 4" delete "below".

Column 4 line 29, change "box 1" to --box 3,--.

Column 4 line 32, change "box 3" to --box 3,--.

Signed and Sealed this
Sixth Day of May, 2014

Michelle K. Lee
*Deputy Director of the United States Patent and Trademark Office*